US012596439B2

(12) United States Patent
Govindu et al.

(10) Patent No.: US 12,596,439 B2
(45) Date of Patent: Apr. 7, 2026

(54) CONTROLLING CONTENT RECEIVER USING CUSTOMIZABLE GESTURAL COMMANDS OF REMOTE CONTROL

(71) Applicant: DISH Network Technologies India Private Limited, Bangalore (IN)

(72) Inventors: Rajesh Govindu, Bangalore (IN); Mansoor Ahmed, Bangalore (IN); Yashwanth Melwanki, Bangalore (IN); PrasannaKumar L, Bangalore (IN); Srinivasarao Duddu, Bangalore (IN)

(73) Assignees: DISH NETWORK TECHNOLOGIES, Bangalore (IN); INDIA PRIVATE LIMITED, Bangalore (IN)

( * ) Notice: Subject to any disclaimer, the term of this patent is extended or adjusted under 35 U.S.C. 154(b) by 0 days.

(21) Appl. No.: 18/586,213

(22) Filed: Feb. 23, 2024

(65) Prior Publication Data

US 2025/0271941 A1     Aug. 28, 2025

(51) Int. Cl.
*G06F 3/01* (2006.01)
*G06F 3/0346* (2013.01)
*G06F 3/038* (2013.01)

(52) U.S. Cl.
CPC .............. *G06F 3/017* (2013.01); *G06F 3/014* (2013.01); *G06F 3/0346* (2013.01); *G06F 3/038* (2013.01)

(58) Field of Classification Search
CPC ........ G06F 3/017; G06F 3/014; G06F 3/0346; G06F 3/038
See application file for complete search history.

(56) References Cited

U.S. PATENT DOCUMENTS

| | | | | |
|---|---|---|---|---|
| 6,034,627 | A * | 3/2000 | Wei ...................... | G06F 3/03543 341/20 |
| 8,570,273 | B1 * | 10/2013 | Smith ................. | G06F 3/03547 345/161 |
| 11,275,453 | B1 * | 3/2022 | Tham ................. | G02B 27/0172 |
| 2007/0035518 | A1 * | 2/2007 | Francz ................... | G08C 17/00 345/163 |
| 2011/0080339 | A1 * | 4/2011 | Sun .......................... | G06F 3/017 345/157 |
| 2016/0202765 | A1 * | 7/2016 | Rew ........................ | G06F 3/014 345/163 |
| 2016/0231819 | A1 * | 8/2016 | Chavez ................... | G06F 3/016 |
| 2017/0123515 | A1 * | 5/2017 | Ha ........................... | G06F 3/038 |

(Continued)

*Primary Examiner* — Md Saiful A Siddiqui
(74) *Attorney, Agent, or Firm* — Seed Intellectual Property Law Group LLP

(57)     ABSTRACT

Techniques are disclosed for controlling a content receiver using customizable gestural commands of a remote. The remote typically includes one or more buttons and a scroll input and is adapted to be held between a first finger and a second finger of a user or using a strap. The content receiver receives a customization function that defines a horizontal function to transform inertial data from the remote control into a horizontal cursor movement and a vertical function to transform the inertial data into a vertical cursor movement. The horizontal function is used to transform the inertial data into the horizontal cursor movement, and the vertical function is used to transform the inertial data into the vertical cursor movement. The horizontal cursor movement and the vertical cursor movement are used to control movement of a cursor on a display.

20 Claims, 7 Drawing Sheets

(56) References Cited

U.S. PATENT DOCUMENTS

| 2017/0351346 A1* | 12/2017 | Hsieh | G06F 3/0346 |
| 2019/0377416 A1* | 12/2019 | Alexander | G06F 3/04815 |
| 2023/0297166 A1* | 9/2023 | Martin | G06F 3/017 |
| | | | 345/156 |

* cited by examiner

502 — Receive command from user to define default orientation of remote control from current orientation 504 — Define default orientation of remote control using rotational data 506 — Modify horizontal function and vertical function based on default orientation to maintain cursor in same position on display when movement of remote control within threshold

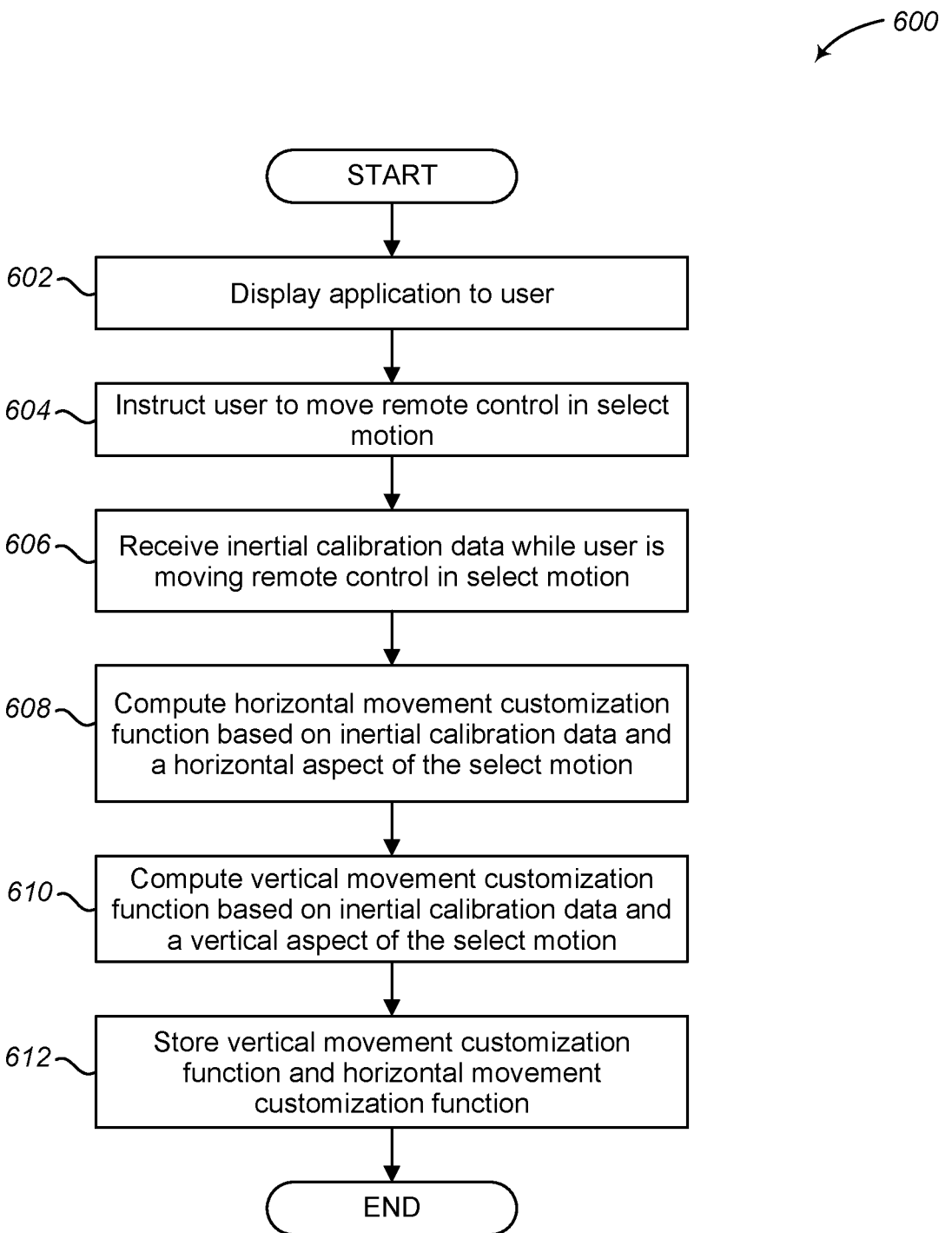

_600_

START

602 — Display application to user

604 — Instruct user to move remote control in select motion

606 — Receive inertial calibration data while user is moving remote control in select motion 608 — Compute horizontal movement customization function based on inertial calibration data and a horizontal aspect of the select motion 610 — Compute vertical movement customization function based on inertial calibration data and a vertical aspect of the select motion 612 — Store vertical movement customization function and horizontal movement customization function

END

FIG. 6

CONTROLLING CONTENT RECEIVER USING CUSTOMIZABLE GESTURAL COMMANDS OF REMOTE CONTROL

BACKGROUND

A user often controls a content receiver using a conventional remote control. For example, a user may navigate menus, fast forward or rewind content, or select items using buttons on a remote control. Content receivers deliver audio-visual content, such as movies, TV shows, web pages, etc., to a display device for presentation to a user. The user often uses a conventional remote control to provide commands to the content receiver to select content, fast forward or rewind content, navigate menus or the internet, etc. Conventional remote controls for content receivers are often bulky, include many buttons, and may be difficult to use in certain contexts. For example, the user may have to look at the conventional remote control to determine which buttons to press, interfering with the viewing experience. Certain navigation buttons of conventional remote controls may be unintuitive to the user or require numerous inputs to perform a task. Additionally, conventional remote controls may be too bulky or complicated for some users to comfortably operate.

BRIEF SUMMARY

Embodiments are directed to controlling a content receiver using customizable gestural commands provided by generating a movement customization function to transform movements of a remote control into commands for the content receiver.

In general, the content receiver receives input specifying a customization function that defines a horizontal function to transform inertial data from the remote control into a horizontal cursor movement and a vertical function to transform the inertial data into a vertical cursor movement. Upon receiving inertial data from the remote control, the content receiver transforms, using the horizontal function, the linear data and the rotational data into the horizontal cursor movement of the cursor, and transforms, using the vertical function, the linear data and the rotational data into the vertical cursor movement of the cursor. The content receiver utilizes the horizontal cursor movement and the vertical cursor movement to control movement of the cursor on a display.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings.

FIG. 6 illustrates a logical flow diagram generally showing one embodiment of a process for calibrating a movement customization function in accordance with embodiments described herein.

DETAILED DESCRIPTION

The following description, along with the accompanying drawings, sets forth certain specific details to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the automobile environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
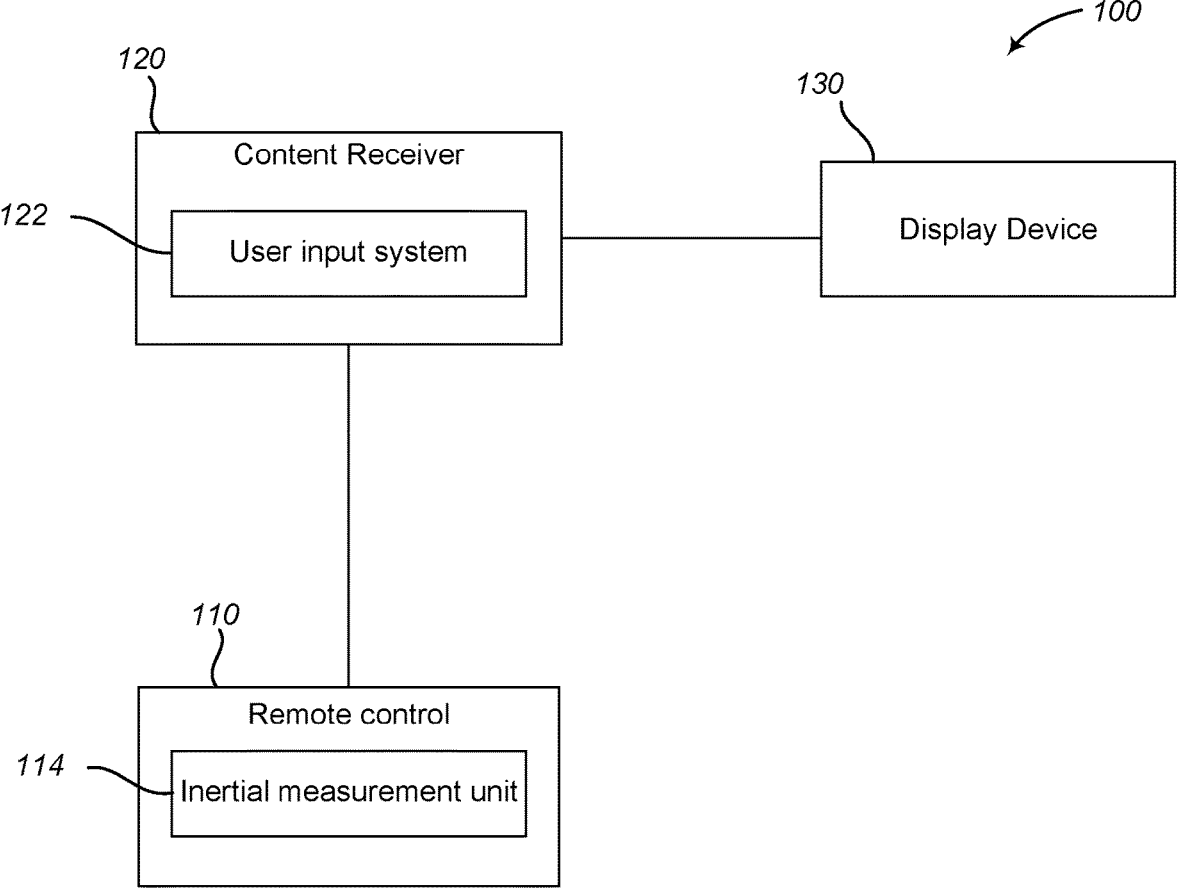
FIG. 1 illustrates a context diagram of an environment for controlling a content receiver using customizable gestural commands of a gestural remote control in accordance with embodiments described herein.

FIG. 1 illustrates a context diagram of an environment 100 for controlling a content receiver using customizable gestural commands of a gestural remote control in accordance with embodiments described herein. The environment 100 includes a gestural remote control 100, a content receiver 120, and a display device 130. The remote 110, the content receiver 120, or the display device 130 may interact with each other or other devices using a communication network which may include wired and wireless communication.

The gestural remote control (remote, gestural remote, or remote control) 110 is a device typically configured to be held between two fingers of a user and to control content receiver 120. The remote 110 includes inertial measurement unit 114. The inertial measurement unit 114 is configured to collect inertial data of the remote 110. The inertial measurement unit 114 may be a six-axis inertial measurement unit that measures rotational data in three dimensions and linear data in three dimensions. In various embodiments, the inertial measurement unit 114 includes a plurality of sensors. The remote 110 obtains inertial data captured by the inertial measurement unit 114. In some embodiments, the remote 100 provides the inertial data to the content receiver 120, which is used to control the content receiver 120. For example, a user may fast forward or rewind content displayed using the content receiver 120 by rotating or translating the remote 110. In other embodiments, the remote 110 may translate the inertial data before providing the transformed inertial data to the content receiver 120.

The content receiver 120 is a device configured to receive content and cause the content to be displayed by display device 130. The content receiver 120 is in some embodiments a set-top box. The remote 110 is in wired or wireless communication with content receiver 120. The content receiver 120 is also in wired or wireless communication with display device 130. In various embodiments, the content receiver 120 includes a user input system 122 that transforms the inertial data received from the remote 110 into commands to interact with the content receiver 120 or the content being displayed using the content receiver 120. Transformations between inertial data and commands may be customized and stored using the content receiver 120, allowing the user to customize how movements of the remote 110 control the content receiver 120. For example, the content receiver 120 may cause an interface to be displayed on the display device 130 whereby the user specifies commands to be executed in response to receiving specified inertial data.

Briefly, a user manipulates the movement or rotation of the remote 110 to control a cursor, or perform other commands or actions, to interact with the displayed content. For example, the user may move or rotate the remote 110 to move the cursor over an element of the content to select the element. The content receiver customizes a vertical function and a horizontal function to transform the inertial data received from a remote 110 into vertical and horizontal movement of the cursor on the display device 130, respectively. By customizing a vertical function and a horizontal function to transform inertial data into vertical and horizontal movements, the content receiver allows the user to configure the remote to be operable according to their preferences or needs. This customization enables a user to interact with the content receiver from a variety of different positions or orientations for a variety of different applications. As such, the customizations can be for specific users, positions, orientations, applications, etc. or some combination thereof. As one non-limiting example, a specific customization of the vertical and horizontal functions can set for augmented reality or virtual reality applications, which allows the user to interact with the augmented reality or mixed reality environment ergonomically, using customized gestural commands. Other applications could have different or independently customized gestural commands.

Figure 2:
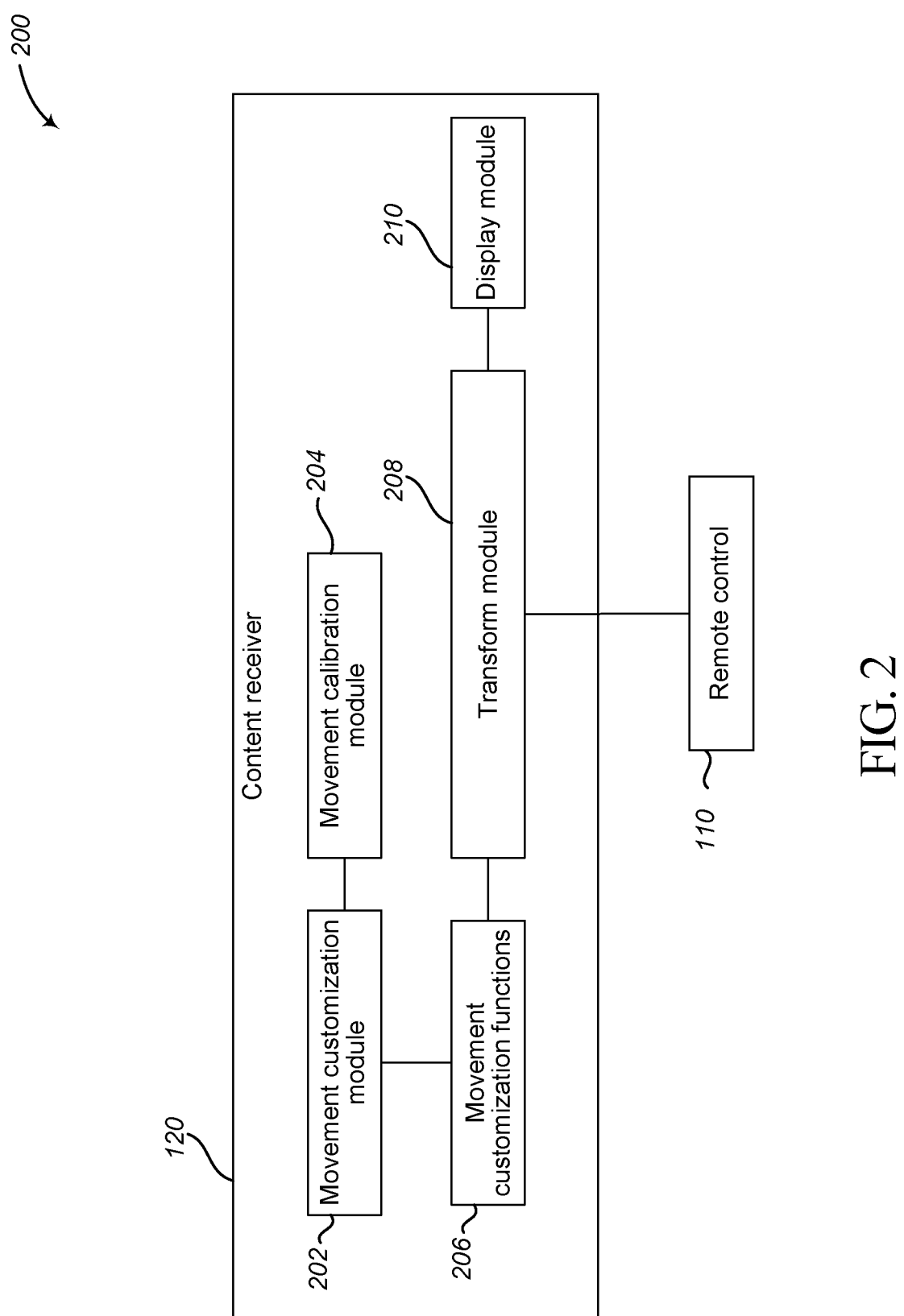
FIG. 2 illustrates a context diagram of a non-limiting embodiment of systems that provide functionality to control a content receiver using customizable gestural commands in accordance with embodiments described herein.

FIG. 2 illustrates a context diagram of a non-limiting embodiment of a system 200 that provides functionality to control a content receiver using customizable gestural commands in accordance with embodiments described herein.

The system 200 includes the remote 110 and the content receiver 120. The remote 110 is typically in wireless communication with the content receiver 120. The content receiver 120 includes a movement customization module 202 that supports customization of movement customization functions 206 to transform inertial data received from the remote 110. For example, the content receiver 120 may use the movement customization module 202 to generate the movement customization functions 206 using user customization input received using movement calibration module 204.

The movement calibration module 204 is an example module used to collect user customization to be used by the movement customization module 202 to generate the movement customization functions 206. Movement calibration module 204 provides for automatically generating a movement customization function based on a user's performance of a select motion using the remote 110. For example, the user may be prompted to move the remote 110 in a motion specified using the display device 130, such as a horizontal or vertical movement. The movement customization module 202 then uses inertial data received from the remote 110 from performance of the select motion to generate the movement customization functions 206.

The movement customization module 202 produces, using user customization input such as from the movement calibration module 204, the movement customization functions 206 to transform inertial data into commands to control an aspect of an application displayed using display module 210. Transform module 208 applies movement customization functions 206 to inertial data received from the remote 110 to transform the inertial data into commands to control content receiver 120 or interact with content displayed using the display module 210.

Figure 3:
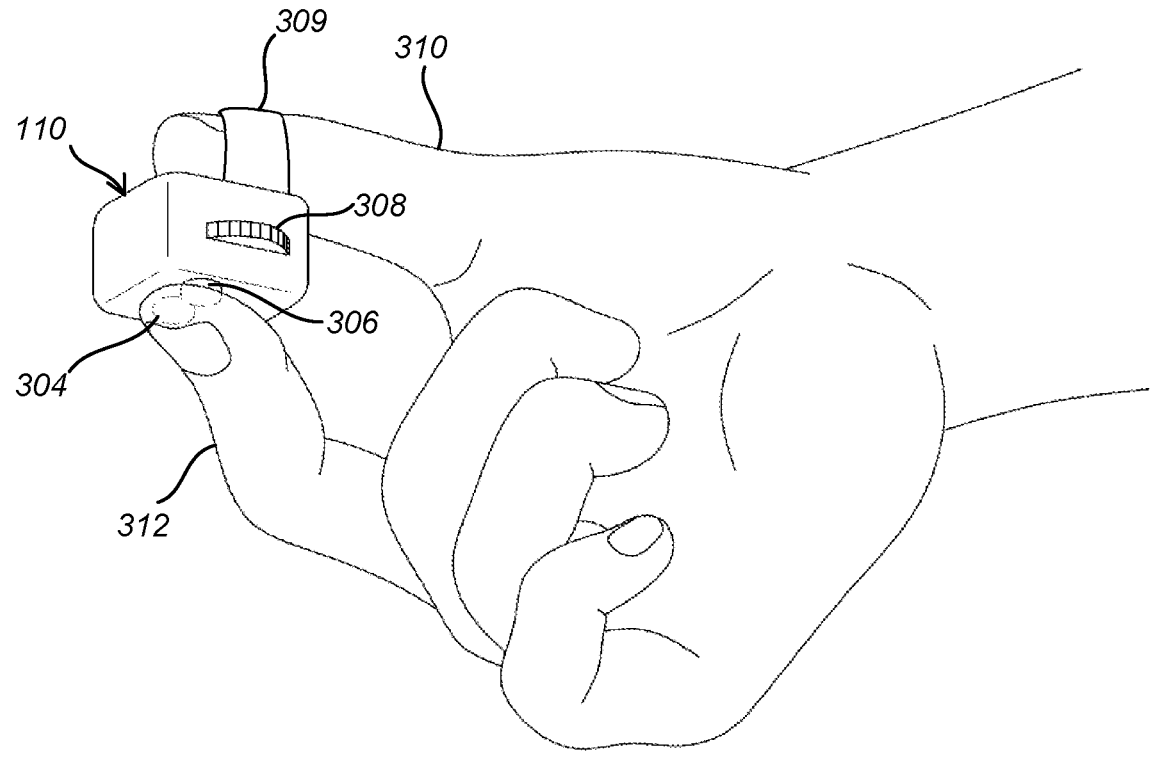
FIG. 3 is a use-case illustration of a user operating a gestural remote control to provide customizable gestural inputs to a content receiver in accordance with embodiments described herein.

FIG. 3 illustrates a context diagram of a user operating the remote 110 to provide customizable gestural inputs to a content receiver in accordance with embodiments described herein. The remote 110 is configured to be lightweight and small in comparison to conventional content receiver remotes. These features enable a user to easily manipulate the remote 110 through a wide range of rotational and translational movements, providing greater flexibility for providing commands to the content receiver. In some embodiments, each dimension of the remote 110 is approximately one inch.

In some embodiments, a housing of remote 110 is configured to be held between a first finger 310 and a second finger 312 of a user. For example, a surface of the remote 110 to be in contact with the first finger 310 or the second finger 312 may be texturized to resist falling from the user's fingers or changing an orientation with respect to the user's fingers. In some embodiments, the remote 110 includes a feature to maintain an orientation of the remote 110 with respect to the first finger 310 or the second finger 312. For example, a surface of the remote 110 may be configured to be in contact with the first finger 310 and may include a depression, channel, aperture, ridge, etc., to prevent movement of the remote 110 with respect to the first finger 310. In some embodiments, the remote 110 is configured to remain in contact with the first finger 310 or the second finger 312 when only one finger is in contact with the remote 110. For example, the remote 110 includes a strap 309 adapted to receive the first finger 310 or the second finger 312 in some embodiments.

The housing of the remote 110 is in some embodiments configured to enable rotation of the remote 110 in one or more axes using the first finger 310 and the second finger 312 independently of rotation of the user's wrist. For example, in embodiments where one or more dimensions of the remote 110 are small in comparison to a user's hand, for example, less than an inch, the remote may be rotated through a wide range of motion, such as greater than 90 degrees, using the first finger 310 and the second finger 312. For example, the housing of the remote 110 may be configured to allow the user to roll the remote 110 between the first finger 310 and the second finger 312. In some embodiments, a dimension of the remote 110 is minimized to enable the remote 110 to roll at least 360 degrees between the first finger 310 and the second finger 312. In some embodiments, the remote 110 is substantially spherical. In general, the housing of the remote 110 is advantageously small, allowing the user to easily gesture with the remote 110.

In the example shown in FIG. 3, the remote 110 includes a first button 304, a second button 306 (collectively "buttons"), a scroll input 308, and a strap 309. In various embodiments, the first button 304 and the second button 306 are configured to supplement or replace gestural inputs. A function of the buttons may in some embodiments change based on a content program, application, menu, etc. displayed using display device 130. For example, the first button 304 may be used to confirm selection of an object indicated by a cursor displayed using display device 130. In another example, input from the buttons is used to open or close menus, fast forward or rewind content, activate voice commands, modify a sensitivity of gestural inputs, etc.

Each of the buttons may be a capacitive button, a mechanical button, or any other known button type. In some embodiments, the buttons are configured to allow operation of the remote 110 using only the first finger 310 and the second finger 312 and are operable by the first finger 310 or the second finger 312. In some embodiments, the buttons correspond to areas on a touch screen. In some embodiments, the remote 110 includes a multidirectional input in addition to or in place of the buttons. For example, the remote 110 may include a joystick configured to be operated by the first finger 310 or the second finger 312. The scroll input 308 as shown in FIG. 3 is a scroll wheel. In some embodiments the scroll wheel 308 is a trackball or a capacitive sensor. In various embodiments, the remote 110 includes 0, 1, 2, or 3 buttons. The buttons and other inputs are in some embodiments configured to be operated using the first finger 310 or the second finger 312 while the remote 110 is held by the first finger 310 and the second finger 312. While the example shown in FIG. 3 shows the first finger 310 as a thumb and the second finger 312 as an index finger, the remote 110 is in various embodiments configured to be held by any combination of fingers, including by one finger.

In various embodiments, the remote 110 includes other input devices such as a microphone. The microphone may collect voice input from the user to control the content receiver or other devices. The remote 110 typically includes a wireless transceiver to communicate wirelessly with the content receiver 120 or other devices. In various embodiments the wireless transceiver is a radio frequency transceiver, a Bluetooth transceiver, etc. In some embodiments, the remote 110 communicates with the content receiver 120 using a wired connection.

The operation of certain aspects of the disclosure will now be described with respect to FIGS. 4, 5, and 6. In at least one of various embodiments, processes 400, 500, and 600 described in conjunction with FIGS. 4, 5, and 6, respectively, are implemented by or executed via circuitry or by a system of one or more computing devices, such as the content receiver 120 or the remote 110 in FIG. 1.

Figure 4:
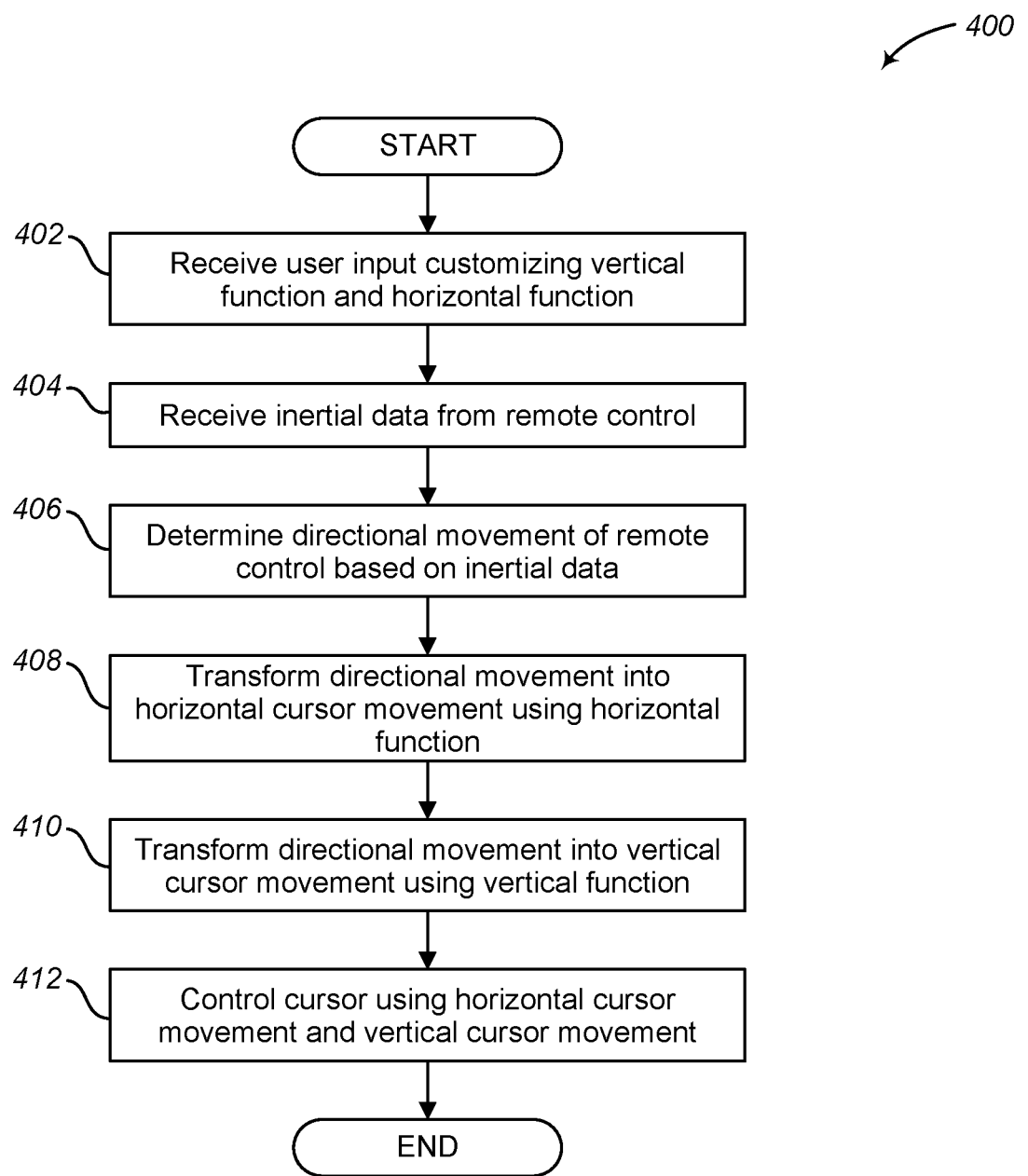
FIG. 4 illustrates a logical flow diagram generally showing one embodiment of a process for controlling a content receiver using customizable gestural commands of a gestural remote control in accordance with embodiments described herein.

FIG. 4 illustrates a logical flow diagram generally showing one embodiment of a process 400 for controlling a content receiver using customizable gestural commands of a gestural remote control in accordance with embodiments described herein. In the example described with respect to FIG. 4, the customizable gestural commands are used to control a cursor displayed on a device such as the display device 130 using the content receiver 120.

At block 402, user input customizing a vertical function and a horizontal function is received. The vertical function is used to transform inertial data into vertical movement of a cursor on a display and the horizontal function is used to transform inertial data into horizontal movement of the cursor on the display. In some embodiments, the user input customizing the vertical or horizontal function includes the user selecting one or more components of the inertial data to transform into vertical or horizontal movement of the cursor on the display. A component of the inertial data is a numerical value representing an orientation of the remote 110. The inertial data may include three linear components corresponding to three axes of linear motion and three rotational components corresponding to three axes of rotational motion. In this example, the inertial data may be represented as a tuple with six values. In various embodiments, the inertial data may include any suitable number of components, for example, one linear component and two rotational components.

The user may select a component of the inertial data to transform into horizontal or vertical motion of the cursor. For example, the user may configure rotation in a first axis to correspond to vertical movement of the cursor and linear movement in a second axis to correspond to horizontal movement of the cursor.

In various embodiments, the user may configure the vertical function or the horizontal function to transform one or more components into cursor movements. The one or more components may include linear data, rotational data, or a combination thereof. For example, the user may customize the horizontal function to move the cursor left on the display based on a first rotational component and right on the display based on a second rotational component.

In various embodiments, the vertical function or horizontal function is customized to alter a movement characteristic of the cursor based on one or more rotational or linear components. For example, the user may specify that a linear component controls a direction of movement of the cursor and a rotational component controls a rate of movement of the cursor. In an example embodiment, a first linear motion and first rotational motion of the remote is transformed into motion in a first direction and at a first speed, while the first linear motion with a second rotational motion is transformed into motion in the first direction and at a second speed. Thus, linear motions of the remote 110 are transformed into cursor movement, while rotational motions are translated into a speed of the cursor movement. In some embodiments, a relationship between rotational data and the speed of the cursor movement follows a one or more acceleration functions that are configurable by a user interface. For example, the user may configure how much rotation affects the speed of the cursor movement.

In various embodiments, the content receiver obtains the vertical function or the horizontal function by a graphical user interface the content receiver causes to be displayed. The content receiver presents one or more options for customizing the vertical function or the horizontal function. In some embodiments, the content receiver causes an interface to display one or more components of inertial data to control horizontal or vertical movement of the cursor. The content receiver may cause the interface to display an indication of a rotational or linear component collected by the inertial measurement unit such as rotation about a first axis. The content receiver may also cause to be displayed a type of cursor movement the rotational or linear component may be used to control, such as moving the cursor horizontally. Then, the content receiver may receive selection of a type of cursor movement to correspond to the rotational or linear component. In some embodiments, the content receiver causes indications of the types of cursor movement to be displayed and receives selection of a rotational or linear component to control each of the one or more actions. The content receiver in various embodiments supports the selection a rotational or linear component by providing a drop-down menu, list of indications, buttons, etc.

In various embodiments, a function to transform inertial data into horizontal and vertical movement of the cursor using a movement calibration process is received, as described with respect to FIG. 6. In some embodiments, the vertical function and the horizontal function are the same function. For example, a customization function including the vertical function and the horizontal function may take inertial data as input and produce a horizontal component and a vertical component of motion for the remote control as output. After block 402, process 400 continues to block 404.

At block 404, inertial data is received from the remote control. In some embodiments, the inertial data includes 6-axis inertial data including three rotational components and three linear components. In some embodiments, the inertial data is transformed by the remote before being received. For example, the remote may apply various signal processing techniques or other transforms to inertial data collected by the inertial measurement unit. The inertial data is received wirelessly or using a wired connection in various embodiments. After block 404, process 400 continues to block 406.

At block 406, a determination of directional movement of the remote control is made based on the inertial data. In some embodiments, the directional movement is determined from the inertial data based on a combination of two or more components of summary of the inertial data. For example, the directional movement may be determined by computing a difference between a first orientation of the remote control and a second orientation of the remote control. In some embodiments, the directional movement is determined by transforming the inertial data using signal processing techniques. For example, a low pass or high pass filter, principal component analysis, etc., may be applied to the inertial data to produce the directional movement. In some embodiments, the directional movement is the inertial data. After block 406, process 400 continues to block 408.

At block 408, the directional movement is transformed into horizontal cursor movement on a display using the horizontal function. In various embodiments, the horizontal function uses a change in one or more components of the linear or rotational data to generate a command to control movement of the cursor. The horizontal function may be used to generate a command to cause the cursor to move in response to detecting a difference between a first rotational data and a second rotational data. For example, if the difference is relatively large during a period of time such as a fraction of a second, the horizontal function may transform the difference into a relatively fast horizontal movement of the cursor. If the difference is relatively small during the period of time, the horizontal function may transform the difference into a relatively slow horizontal movement of the cursor.

In some embodiments, the horizontal function may move the cursor in response to detecting a difference between a first rotational data and a default rotation value. For example, when the user rotates the remote from a default rotation and holds the remote at the rotated position, the cursor may continue to move until the user returns the remote to the default rotation. After block 408, process 400 continues to block 410.

At block 410, the directional movement is transformed into vertical cursor movement on the display using the vertical function. In various embodiments, techniques similar to those described with respect to block 408 are employed to transform directional movement into vertical cursor movement using the vertical function. After block 410, process 400 continues to block 412.

At block 412, movement of the cursor on the display is controlled using the horizontal cursor movement and the vertical cursor movement. In some embodiments, when the user rotates the remote from a default rotation, the horizontal or vertical function causes the cursor to move in response to detecting a change in an orientation as measured by the inertial measurement unit. In some embodiments, the horizontal or vertical function causes the cursor to move in response to detecting a change in the orientation as measured by the inertial measurement unit, regardless of an orientation of the remote. For example, the user holding the remote at their side, resting on a couch, etc., may not cause the cursor to move because there may be little or no change in the orientation as measured by the inertial measurement unit. In various embodiments, similar functionality is implemented with respect to linear movement or a combination of linear movement and rotational movement.

In some embodiments, movement of the cursor using the horizontal function or the vertical function is enabled in response to receiving specified input from the remote such as a button press, voice command, etc. In some embodiments, receiving the specified input enables movement of the cursor for a configurable amount of input time such as 1 second, 5 seconds, 30 seconds, etc. In some embodiments, receiving the specified input enables movement of the cursor until a second specified input is received. For example, movement of the cursor may be enabled while a button is pressed and disabled when the button is released. In various embodiments, the specified input and the second specified input are collected by different input devices. After block 412, process 400 ends at an end block.

While the functions for transforming inertial data into cursor movements are referred to herein as "vertical function" and "horizontal function" for ease of discussion with respect to controlling a cursor, in various embodiments the functions do not control vertical or horizontal movement of a cursor. The functions may determine how inertial data is transformed into various commands to control the content receiver to perform actions. Additionally, any number of functions may be specified, not just a vertical function and a horizontal function. For example, in an embodiment where an action to be performed is rewinding a content program, a rewind function may be used to transform inertial data or other data into a command to cause the content receiver to rewind the content program. In various embodiments, the action to be performed is based on content or an application the content receiver causes to be displayed, and the content receiver receives customization of a function to transform inertial data or other data into a command that causes the content receiver to perform the action. In various embodiments, the content receiver 120 causes an interface to be displayed showing one or more actions that may be taken with respect to a current application and receives customization of functions corresponding to the one or more actions.

Functions such as the vertical function and the horizontal function may be customized to perform actions with respect to any application, content, or interface displayed using the content receiver 120. The customizations may also be stored for use in future instances of a corresponding application. For example, when the user is interacting with a movie, TV show, music, etc., actions the user may wish to customize may include play, pause, fast-forward, or rewind. Therefore, functions may be customized to perform one or more of these actions in addition to or instead of controlling the cursor on the display. Similarly, when the content receiver may provide for customizing functions to transform inertial data into various action in a video game. Other applications that may be controlled using the remote 110 and customized functions include web browsing, gaming, application navigation, presentation control, text input, augmented reality or virtual reality navigation, etc. For example, a user playing a video game may use one or more functions customized with respect to the video game to perform one or more actions available in the video game using the remote 110.

Figure 5:
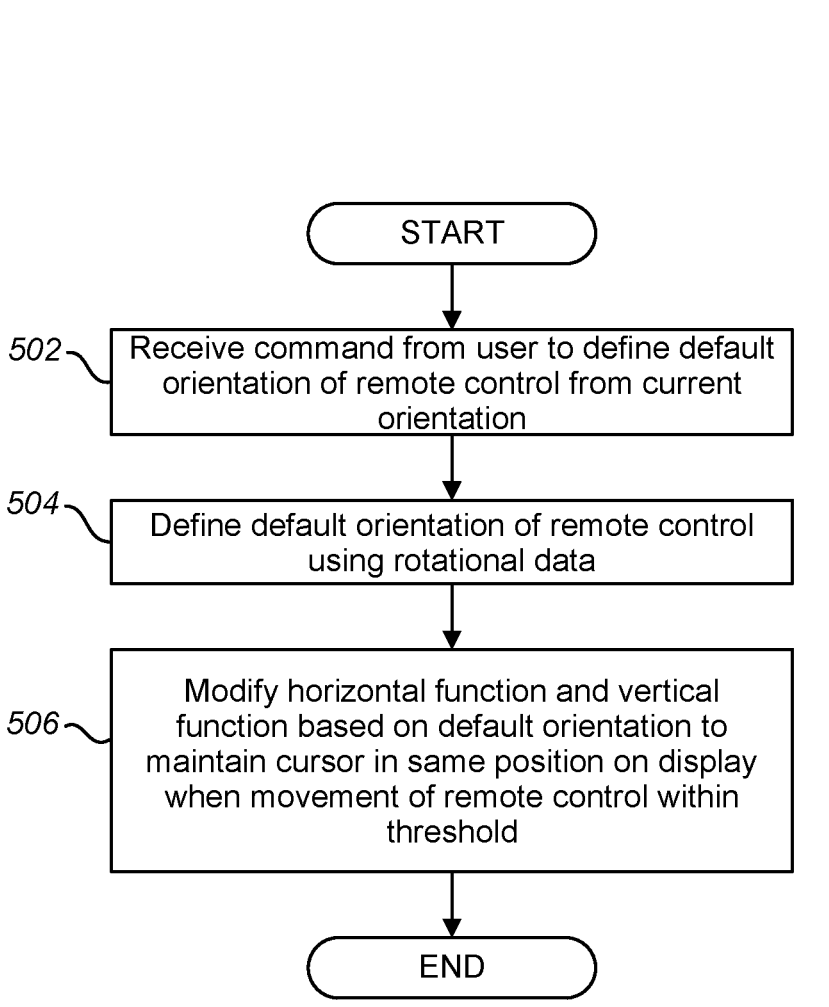
FIG. 5 illustrates a logical flow diagram generally showing one embodiment of a process for setting a default position for a gestural remote control in accordance with embodiments described herein.

FIG. 5 illustrates a logical flow diagram generally showing one implementation of a process 500 for setting a default orientation for a remote control in accordance with embodiments described herein. As discussed herein, in some embodiments a cursor on a display is moved based on a difference between a default orientation of the remote control and a current orientation of a remote. Therefore, in some embodiments a user may desire to designate a current orientation as a default orientation that does not cause a command to be sent to control the content receiver, such as a command to control cursor movement.

Process 500 begins, after a start block, at block 502, where input is received from a user to define a default orientation of a remote control from a current orientation of the remote control. In various embodiments, the command includes an indication of a button press or other input, a voice command, or a predefined gestural input. In some embodiments, the user may specify a command to define the default orientation from the current orientation. For example, the user may specify that the command is a particular motion such as shaking the remote, moving the remote in a circular, triangular, or other motion, etc., a button press, sequence of button presses, or combination of button presses, a voice command, or a combination thereof.

The default orientation may be a preset orientation, such as holding the remote 110 at a particular angle. The default orientation may also be dynamically determined. In some embodiments, if movement of the remote 110 is within a threshold for a default position reset time period such as 3, 5, or 10 seconds, a current orientation of the remote 110 may be set as the default orientation. For example, if a user lowers the remote 110 to their side, the default orientation may be changed to be the current position at the user's side after the default position reset time period elapses without the content receiver 120 receiving additional input from the user by the remote 110. In some embodiments the default position reset time period is configurable by the user.

In some embodiments, the remote 110 is caused to enter a low-power mode in response to the default position reset time period elapsing without receiving additional input from the user. In some embodiments, low-power mode is entered to a different time period than the default position reset time period elapsing. The remote 110 may exit low-power mode in response to receiving user input satisfying an exit low power threshold. After block 502, process 500 continues to block 504.

At block 504, a default orientation of the remote 110 is defined using rotational data collected by inertial measurement unit 114 of remote 110. For example, a first default orientation of the remote 110 may correspond to rotational data (0, 0, 0), (0, 90, 0), etc., wherein each component of the rotational data corresponds to a number of degrees the inertial measurement unit of the remote is rotated with respect to a default orientation of the inertial measurement unit in three dimensions. In some embodiments, the rotational data for the current orientation is rounded to the nearest 90 degrees to define a new default orientation. For example, if input is received to define the default orientation at a current orientation of (11, 260, 87), the default orientation may be defined as (0, 270, 90). In some embodiments, the inertial measurement unit is "zeroed" in response to receiving input to define the default orientation, such that the default orientation is (0, 0, 0). Rotational data may be saved before the inertial measurement unit is zeroed, such that the default orientation may be compared to previously defined default orientations as discussed below.

In some embodiments, the default orientation is compared to previously defined default orientations such that one or more settings previously associated with a previous default orientation may be restored. Continuing the example above, if a user has previously defined a default orientation corresponding to (0, 270, 90) and has customized a function with respect to that default orientation, the customized settings may be applied in response to receiving input defining the default orientation as (0, 270, 90). In this way, customizations a user makes with respect to various default orientations for the remote may be applied to later instances of those orientations. Thus, the user may seamlessly change between default orientations of the remote without re-customizing an orientation. After block 504, process 500 continues to block 506.

At block 506, the horizontal function and the vertical function are modified based on the default orientation to maintain the cursor in a same position on the display when movement of the remote is within a threshold. In some embodiments, the threshold is used to define a range of orientations considered to be equivalent to the default orientation such that movements of the remote away from the default orientation but within the threshold of the default orientation do not cause the cursor to move. In some embodiments, the threshold is a number of degrees from the default position that a user must move the remote before the horizontal function produces movement of the cursor in the screen or other actions. For example, a user may specify that movements within 5, 15, 45, 90, etc., degrees of the default orientation do not cause the cursor to move, while movement in orientations above the threshold are to be transformed into motion of the cursor on the display. Similarly, a user may specify that any movements not satisfying a threshold of angular acceleration or linear acceleration are to be disregarded, and movements satisfying the threshold are to be transformed into motion of the cursor on the display or actions. For example, the user may specify that movements having angular acceleration below a threshold are to be disregarded such that certain actions such as laying down the remote, moving the remote to rest at the user's side, etc., disable movement of the cursor on the display or other command, while rapid rotations of the remote having angular acceleration above the threshold enable the command to be sent. Similarly, linear movements having acceleration or magnitude below a linear threshold may not produce commands, while movements above the threshold do produce commands. After block 506, process 500 ends at an end block.

FIG. 6 illustrates a logical flow diagram generally showing one embodiment of a process 600 for calibrating a movement customization function in accordance with embodiments described herein. Process 600 begins, after a start block, at block 602, where an application is displayed to a user. In various embodiments, the application is a video game, augmented reality or virtual reality application, a presentation application, a text input application, etc. Process 600 supports automatic customization of functions to transform inertial data or other data into commands to control a content receiver.

At block 604, instructions are provided to the user to move the remote 110 in a select motion. The select motion may be a predetermined motion designed to generate inertial data from the remote 110 that is used to generate horizontal and vertical movement customization functions from user movement. Users may have differences in how they move the remote 110 in response to being prompted to move the remote in the select motion. For example, if instructions are provided for the user to move an on-screen cursor in a circle, the user may move the remote 110 in a relatively small or large circle, rotate the remote 110, point the remote 110 at the screen or in another direction, etc. Collecting inertial data from remote 110 in response to providing instructions to move the remote in a select motion allows generated movement customization functions to automatically assess and account for the user's individual methods of operating the remote 110.

In some embodiments, an indication of the select motion is displayed to instruct the user to move the remote 110 in the select motion. For example, in some embodiments a visual indication of the select motion such as an arrow or animation is displayed, text describing the select motion to the user is displayed, or a picture or video demonstrating the select motion is displayed. In some embodiments, instructions are provided audially using text-to-voice. In some embodiments, the select motion is selected to acquire data to define a vertical function and a horizontal function. By associating inertial data received from the remote 110 to the select motion, movements used by the user to indicate the select motion may be recognized in the future and used to perform the action corresponding to the select motion. For example, if the user is prompted to move a displayed cursor horizontally, and rotates the remote 110 in response, the user indicates that they use rotation of the remote to indicate horizontal movement of the cursor. The instructions to move the remote in the select motion may describe a function to be performed instead of a particular motion of the remote 110 to be performed. For example, a text prompt requesting the user to "move the remote to indicate vertical cursor movement" may be used as the instructions to move the remote control in the select motion. In some embodiments, the select motion has a vertical component and a horizontal component. For example, the user may be instructed to move the remote 110 diagonally such that a vertical component and a horizontal component of the movement may be collected to define horizontal and vertical movement of a cursor. After block 604, process 600 continues to block 606.

At block 606, inertial calibration data is received while the inertial measurement unit of the remote control is being moved in the select motion. In some embodiments, the inertial calibration data includes inertial data collected by the inertial measurement unit 114 of the remote control 110. The inertial data in some embodiments includes three rotational components and three linear components. After block 606, process 600 continues to block 608.

At block 608, a horizontal movement customization function is computed based on the inertial calibration data and a horizontal aspect of the select motion. By computing the horizontal movement customization function, the user's movements of remote 110 as reflected in the inertial calibration data are mapped to the select motion. The horizontal movement customization function may transform the horizontal aspect of the select motion into a horizontal movement of the cursor. In some embodiments, the horizontal movement customization function is created using a difference between the inertial calibration data and an expected inertial calibration data. For example, the expected inertial calibration data may be an average of inertial calibration data received from a number of users in response to being prompted to move remotes in the select motion. In some embodiments, the horizontal aspect of the select motion is zero. In some embodiments, a trained artificial intelligence model is used to generate the horizontal movement customization function from the inertial calibration data, wherein the trained artificial intelligence model is trained using inertial data received in response to the select motion. After block 608, process 600 continues to block 610.

At block 610, a vertical movement customization function is computed based on the inertial calibration data and a vertical aspect of the select motion. In various embodiments, block 610 employs embodiments similar to block 608 to compute a vertical movement customization function. After block 610, process 600 continues to block 612.

At block 612, the vertical movement customization function and the horizontal movement customization function are stored such that future movements of the remote 110 by the user may be transformed accordingly. In some embodiments, the movement customization functions are stored with respect to a user profile such that one or more users may use the remote 110 with their corresponding movement customization functions. After block 612, process 600 ends at an end block.

As discussed herein, the disclosure is not limited to customizing a horizontal and vertical function to control a cursor. Accordingly, the select motion may be selected based on one or more actions the user may take with respect to the displayed application. In a video game, actions to be taken may include turning a character right or left, making the character run, etc. For example, the select motion corresponding to moving left in the video game may include moving the remote control left, or the select motion for running in the video game may include rotating the remote control. Then, when input corresponding to the action is received from remote 110 in future instances of the displayed application, the corresponding action is performed. In some embodiments, a plurality of instances of the select motion are received to define a range of inertial data to correspond to the action.

Figure 7:
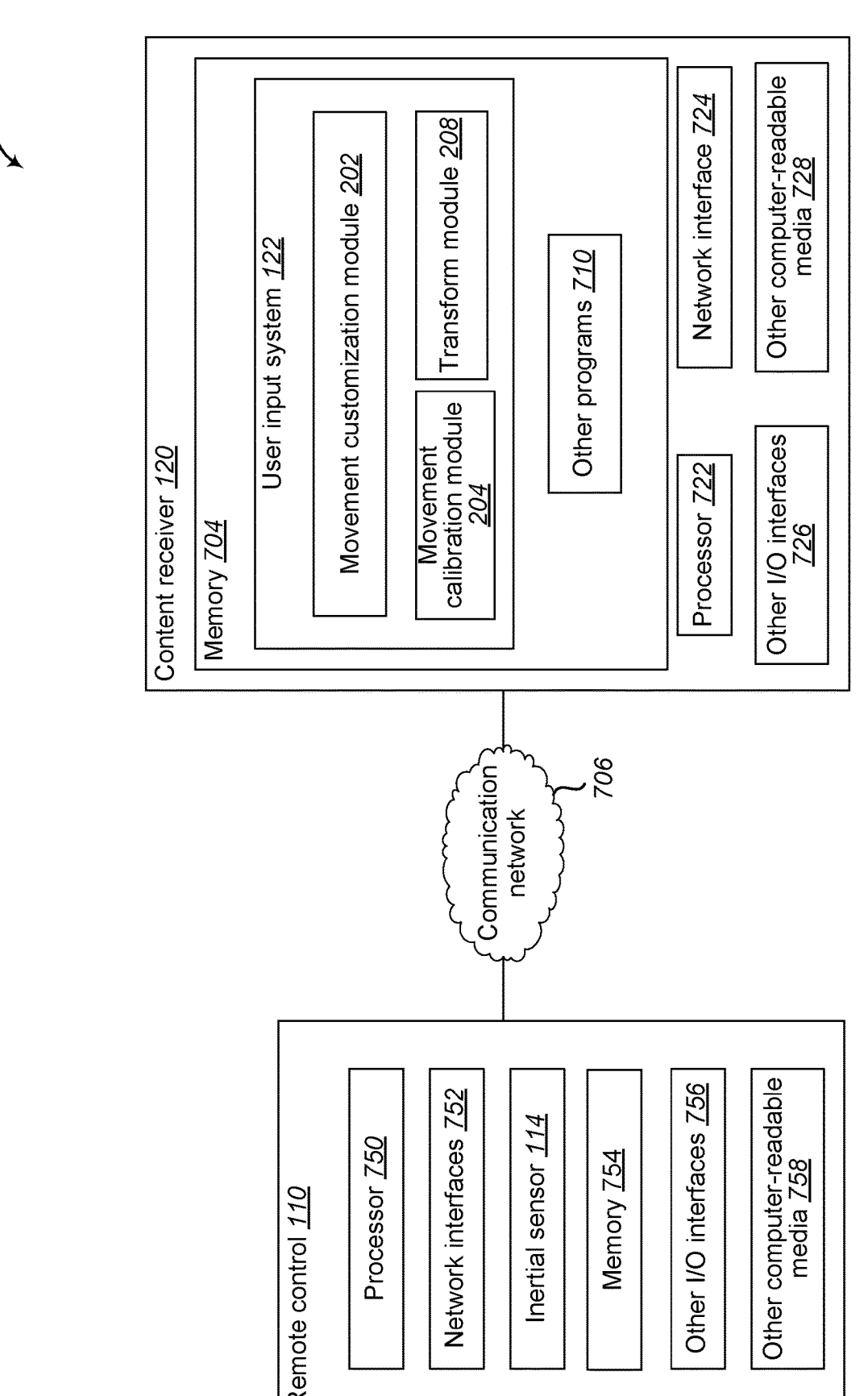
FIG. 7 shows a system diagram that describes computing systems for implementing embodiments described herein.

FIG. 7 shows a system diagram that describes one implementation of computing systems for implementing embodiments described herein. System 700 includes remote control 110 and content receiver 120.

As described herein, content receiver 120 is a computing device that can perform functionality described herein for using customizable gestural commands of a remote control. One or more special purpose computing systems may be used to implement the content receiver 120. Accordingly, various embodiments described herein may be implemented in software, hardware, firmware, or in some combination thereof. Content receiver 120 includes memory 704, one or more processors 722, network interface 724, other input/output (I/O) interfaces 726, and other computer-readable media 728. In some embodiments, content receiver 120 may be implemented by cloud computing resources.

Processor 722 includes one or more processors, processing units, programmable logic, circuitry, or other computing components that are configured to perform embodiments described herein or to execute computer instructions to perform embodiments described herein. In some embodiments, processor 722 may include a single processor that operates individually to perform actions. In other embodiments, processor 722 may include a plurality of processors that operate to collectively perform actions, such that one or more processors may operate to perform some, but not all, of such actions. Reference herein to "a processor system" refers to one or more processors 722 that individually or collectively perform actions. And reference herein to "the processor system" refers to 1) a subset or all of the one or more processors 722 comprised by "a processor system" and 2) any combination of the one or more processors 722 comprised by "a processor system" and one or more other processors 722.

Memory 704 may include one or more various types of non-volatile or volatile storage technologies. Examples of memory 704 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. Memory 704 may be utilized to store information, including computer-readable instructions that are utilized by processor 722 to perform actions, including at least some embodiments described herein.

Memory 704 may have stored thereon user input system 122. User input system 122 includes movement customization module 202, movement calibration module 204, and transform module 208. Movement customization module 202 provides for computing user-customized movement functions as described herein. Movement calibration module 204 provides for automatically generating customization functions in response to receiving calibration data, while transform module 208 transforms inertial data into commands using the user-customized movement functions.

Memory 704 may also store other programs 710, which may include operating systems, user applications, or other computer programs.

Network interfaces 724 are configured to communicate with other computing devices, such as user computing device 124, via a communication network 706. Network interfaces 724 include transmitters and receivers (not illustrated) to send and receive data from remote control 110 or other devices.

Other I/O interfaces 726 may include interfaces for various other input or output devices, such as audio interfaces, other video interfaces, USB interfaces, physical buttons, keyboards, haptic interfaces, tactile interfaces, or the like. Other computer-readable media 728 may include other types of stationary or removable computer-readable media, such as removable flash drives, external hard drives, or the like.

Processor 750, network interfaces 752, memory 754, other I/O interfaces 756, and other computer-readable media 758 of remote control 110 are in various embodiments similar to corresponding components discussed with respect to content receiver 120.

None of the components shown in FIG. 7 and discussed above constitute a data signal per se. While computer systems configured as described above are typically used to support embodiments described herein, those skilled in the art will appreciate that the embodiments may be implemented using devices of various types and configurations and having various components.

By employing embodiments described herein, the gestural remote control provides customizable gestural input to the content receiver. Also, embodiments described herein improve the functioning of computer or other hardware, such as by reducing the dynamic display area, processing, storage, or data transmission resources needed to perform a certain task, thereby enabling the task to be permitted by less capable, capacious, or expensive hardware devices, or be performed with lesser latency, or preserving more of the conserved resources for use in performing other tasks. For example, by allowing a user to customize gestural commands, computing resources that would otherwise be dedicated to interpreting a potentially large number of default commands for each custom command may be conserved.

Further, for at least some of the domains and scenarios discussed herein, the processes described herein as being performed automatically by a computing system cannot practically be performed in the human mind, for reasons that include that the starting data, intermediate state(s), and ending data are too voluminous or poorly organized for human access and processing, or are a form not perceivable or expressible by the human mind; the involved data manipulation operations or subprocesses are too complex, or too different from typical human mental operations; required response times are too short to be satisfied by human performance; etc. For example, a human mind cannot transform inertial data received from an inertial measurement unit into a command to wirelessly control an aspect of a displayed application.

The following is a summarization of the claims as originally filed.

A system may be summarized as including a content receiver and a remote control. The remote control is adapted to be held and operated by a first finger and a second finger of a user and includes an inertial sensor configured to collect inertial data including linear data and rotational data and a wireless transmitter configured to transmit the inertial data. The content receiver includes a wireless receiver configured to receive the inertial data from the remote control and one or more memories collectively configured to store computer instructions, to store a horizontal function to transform the inertial data into a horizontal movement of a cursor on a display, and to store a vertical function to transform the inertial data into a vertical movement of the cursor on the display. The content receiver also includes a processor system configured to execute the computer instructions to receive user input customizing the horizontal function and the vertical function. Then the processor system receives, via the wireless receiver and from the remote control, the inertial data and determines directional movement of the remote control using the inertial data.

The processor system transforms, using the horizontal function, the directional movement into a horizontal cursor movement to control horizontal movement of a cursor on a display and transforms, using the vertical function, the directional movement into a vertical cursor movement to control vertical movement of the cursor on the display. Then, the processor system controls movement of the cursor on the display using the horizontal cursor movement and the vertical cursor movement.

In some embodiments the processor system transforms the directional movement into the horizontal cursor movement by being configured to further execute the computer instructions to utilize the linear data of the inertial data and the horizontal function to transform the directional movement into the horizontal cursor movement.

In some embodiments the processor system transforms the directional movement into the horizontal cursor movement by being configured to further execute the computer instructions to utilize the rotation data of the inertial data and the horizontal function to transform the directional movement into the horizontal cursor movement.

In some embodiments the processor system transforms the directional movement into the horizontal cursor movement by being configured to further execute the computer instructions to utilize a combination of the linear data and the rotational data of the inertial data and the horizontal function to transform the directional movement into the horizontal cursor movement.

In some embodiments the processor system transforms the directional movement into the vertical cursor movement by being configured to further execute the computer instructions to utilize the linear data of the inertial data and the vertical function to transform the directional movement into the vertical cursor movement.

In some embodiments the processor system transforms the directional movement into the vertical cursor movement by being configured to further execute the computer instructions to utilize the rotation data of the inertial data and the vertical function to transform the directional movement into the vertical cursor movement.

In some embodiments the processor system transforms the directional movement into the vertical cursor movement by being configured to further execute the computer instructions to utilize a combination of the linear data and the rotational data of the inertial data and the vertical function to transform the directional movement into the vertical cursor movement.

In some embodiments, the processor system is further configured to receive a command from the user to define a default orientation of the remote control from a current orientation of the remote control, define the default orientation of the remote control using the rotational data, and modify the horizontal function and the vertical function based on the default orientation to maintain the cursor in a same position on the display when a movement of the remote control is within a threshold of the default orientation.

In some embodiments, the processor system is further configured to modify the horizontal function and the vertical function based on the default orientation such that the horizontal function transforms the inertial data into the horizontal movement of the cursor relative to the default orientation and the vertical function transforms the inertial data into the vertical movement of the cursor relative to the default orientation.

In some embodiments, the processor system is further configured to track, in response to receiving the inertial data, a time elapsed from receiving last inertial data that satisfied a first movement threshold, in response to the time elapsed meeting a timeout threshold, cause the remote control to enter a low-power mode, and, in response to receiving second inertial data that satisfies a second movement threshold, cause the remote control to exit the low-power mode.

In some embodiments the remote control includes a button, and the processor system is further configured to control the content receiver based on an input received via the button.

A method may be summarized as receiving input specifying a customization function, wherein the customization function defines at least one transformation of inertial data into a horizontal movement and a vertical movement of a cursor on a display, wherein the inertial data includes at least one linear component and at least one rotational component indicating a movement of a remote; receiving the inertial data from the remote control; transforming, using the customization function, a combination of the at least one linear component and the at least one rotational component into a horizontal cursor movement and a vertical cursor movement; and controlling movement of the cursor on the display using the horizontal cursor movement and the vertical cursor movement.

In some embodiments the customization function controls the horizontal movement of the cursor on the display based on a rotational component of the inertial data and controls the vertical movement of the cursor on the display based on a linear component of the inertial data.

In some embodiments, receiving the input specifying the customization function includes receiving a user selection of a first component of the inertial data to control the horizontal movement and a second component of the inertial data to control the vertical movement.

In some embodiments, transforming, using the customization function, the combination of the linear component and the rotational component into the horizontal cursor movement and the vertical cursor movement, includes transforming the at least one linear component into the horizontal cursor movement and transforming the at least one rotational component into the vertical cursor movement.

In some embodiments, transforming, using the customization function, the combination of the linear component and the rotational component into the horizontal cursor movement and the vertical cursor movement, includes transforming a first rotational component of the at least one rotational component into the horizontal cursor movement and transforming a second rotational component in the at least one rotational component into the vertical cursor movement.

In some embodiments, transforming, using the customization function, the combination of the linear component and the rotational component into the horizontal cursor movement and the vertical cursor movement, includes transforming a first rotational component in the at least one rotational component into a rate of movement of the horizontal cursor movement and transforming a second rotational component in the at least one rotational component into a rate of movement of the vertical cursor movement.

In some embodiments transforming, using the customization function, the combination of the linear component and the rotational component into the horizontal cursor movement and the vertical cursor movement, includes transforming a first linear component of the at least one linear component into the horizontal cursor movement; transforming a first rotational component in the at least one rotational component into a rate of movement of the horizontal cursor movement; transforming a second linear component of the at least one linear component into the vertical cursor movement; and transforming a second rotational component of the at least one rotational component into a rate of movement of the vertical cursor movement.

In some embodiments, a relationship between the first rotational data and the rate of horizontal movement follows a horizontal acceleration function that is configurable by a user interface and a relationship between the second rotational data and the rate of vertical movement follows a vertical acceleration function that is configurable by the user interface.

A remote control may be summarized as including a housing configured to be held between a first finger and a second finger of a user; one or more buttons, wherein each of the one or more buttons is configured to be operable by the first finger or the second finger of the user while the user is holding the housing of the remote control between the first finger and the second finger; an inertial measurement unit configured to collect inertial data, wherein the inertial data includes at least one linear component and at least one rotational component that indicate a movement of the remote control; a wireless transmitter configured to transmit horizontal cursor movement data and vertical cursor movement data from the remote control to a content receiver; one or more memories configured to collectively store computer instructions and a customization function, wherein the customization function defines at least one transformation of the inertial data into the horizontal cursor movement data and the vertical cursor movement data to control a cursor on a display; and one or more processors configured to execute the computer instructions to: obtain the inertial data from the inertial measurement unit; transform, using the customization function, a combination of the at least one linear component and the at least one rotational component into the horizontal cursor movement data and the vertical cursor movement data; and transmit, by the wireless transmitter, the horizontal cursor movement data and the vertical cursor movement data to the content receiver for controlling the cursor on the display.

The various embodiments described above can be combined to provide further embodiments. All of the U.S. patents, U.S. patent application publications, U.S. patent applications, foreign patents, foreign patent applications and non-patent publications referred to in this specification or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
a remote control adapted to be held and operated by a first finger and a second finger of a user or that includes a strap adapted to receive the first finger or the second finger of the user, the remote control including:
an inertial measurement unit configured to collect inertial data including linear data and rotational data; and
a wireless transmitter configured to transmit the inertial data; and
a content receiver including:
a wireless receiver configured to receive the inertial data from the remote control;

one or more memories collectively configured to store computer instructions; and
a processor system configured to execute the computer instructions to:
receive first user input that customizes a horizontal function for a user, wherein the horizontal function defines how to transform the inertial data into horizontal movement of a cursor on a display for the user;
receive second user input that customizes a vertical function for the user, wherein the vertical function defines how to transform the inertial data into vertical movement of the cursor on the display for the user;
receive, via the wireless receiver and from the remote control, the inertial data;
determine directional movement of the remote control using the inertial data;
transform, using the horizontal function as customized for the user, the directional movement into a horizontal cursor movement to control the horizontal movement of the cursor on the display;
transform, using the vertical function as customized for the user, the directional movement into a vertical cursor movement to control the vertical movement of the cursor on the display; and
control movement of the cursor on the display using the horizontal cursor movement and the vertical cursor movement.

2. The system of claim 1, wherein the processor system transforms the directional movement into the horizontal cursor movement by being configured to further execute the computer instructions to:
utilize the linear data of the inertial data and the horizontal function to transform the directional movement into the horizontal cursor movement.

3. The system of claim 1, wherein the processor system transforms the directional movement into the horizontal cursor movement by being configured to further execute the computer instructions to:
utilize the rotation data of the inertial data and the horizontal function to transform the directional movement into the horizontal cursor movement.

4. The system of claim 1, wherein the processor system transforms the directional movement into the horizontal cursor movement by being configured to further execute the computer instructions to:
utilize a combination of the linear data and the rotational data of the inertial data and the horizontal function to transform the directional movement into the horizontal cursor movement.

5. The system of claim 1, wherein the processor system transforms the directional movement into the vertical cursor movement by being configured to further execute the computer instructions to:
utilize the linear data of the inertial data and the vertical function to transform the directional movement into the vertical cursor movement.

6. The system of claim 1, wherein the processor system transforms the directional movement into the vertical cursor movement by being configured to further execute the computer instructions to:
utilize the rotation data of the inertial data and the vertical function to transform the directional movement into the vertical cursor movement.

7. The system of claim 1, wherein the processor system transforms the directional movement into the vertical cursor movement by being configured to further execute the computer instructions to:

utilize a combination of the linear data and the rotational data of the inertial data and the vertical function to transform the directional movement into the vertical cursor movement.

8. The system of claim 1, wherein the processor system is further configured to:

receive a command from the user to define a default orientation of the remote control from a current orientation of the remote control;

define the default orientation of the remote control using the rotational data; and modify the horizontal function and the vertical function based on the default orientation to maintain the cursor in a same position on the display when a movement of the remote control is within a threshold of the default orientation.

9. The system of claim 8, wherein the processor system is further configured to:

modify the horizontal function and the vertical function based on the default orientation such that the horizontal function transforms the inertial data into the horizontal movement of the cursor relative to the default orientation and the vertical function transforms the inertial data into the vertical movement of the cursor relative to the default orientation.

10. The system of claim 1, wherein the processor system is further configured to:

track, in response to receiving the inertial data, a time elapsed from receiving last inertial data that satisfied a first movement threshold;

cause, in response to the time elapsed meeting a timeout threshold, the remote control to enter a low-power mode; and in response to receiving second inertial data that satisfies a second movement threshold, cause the remote control to exit the low-power mode.

11. The system of claim 1, wherein the remote control includes a button, and the processor system is further configured to:

control the content receiver based on an input received via the button.

12. A method comprising:

receiving user input specifying a customization function for a user, wherein the customization function defines at least one transformation of inertial data into a horizontal movement, a vertical movement, and a rate of movement of a cursor on a display, wherein the inertial data includes at least one linear component and at least one rotational component indicating a movement of a remote;

receiving the inertial data from the remote control;

transforming, using the customization function, a combination of the at least one linear component and the at least one rotational component into a horizontal cursor movement and a vertical cursor movement based on the rate of movement defined by the customization function; and controlling movement of the cursor on the display for the user using the horizontal cursor movement and the vertical cursor movement.

13. The method of claim 12, wherein the customization function controls the horizontal movement of the cursor on the display based on a rotational component of the inertial data and controls the vertical movement of the cursor on the display based on a linear component of the inertial data.

14. The method of claim 12, wherein receiving the input specifying the customization function comprises:

receiving a user selection of a first component of the inertial data to control the horizontal movement and a second component of the inertial data to control the vertical movement.

15. The method of claim 12, wherein transforming, using the customization function, the combination of the linear component and the rotational component into the horizontal cursor movement and the vertical cursor movement, comprises:

transforming the at least one linear component into the horizontal cursor movement; and transforming the at least one rotational component into the vertical cursor movement.

16. The method of claim 12, wherein transforming, using the customization function, the combination of the linear component and the rotational component into the horizontal cursor movement and the vertical cursor movement, comprises:

transforming a first rotational component of the at least one rotational component into the horizontal cursor movement; and transforming a second rotational component in the at least one rotational component into the vertical cursor movement.

17. The method of claim 12, wherein transforming, using the customization function, the combination of the linear component and the rotational component into the horizontal cursor movement and the vertical cursor movement, comprises:

transforming a first rotational component in the at least one rotational component into a horizontal rate of movement of the horizontal cursor movement; and transforming a second rotational component in the at least one rotational component into a vertical rate of movement of the vertical cursor movement.

18. The method of claim 12, wherein transforming, using the customization function, the combination of the linear component and the rotational component into the horizontal cursor movement and the vertical cursor movement, comprises:

transforming a first linear component of the at least one linear component into the horizontal cursor movement;

transforming a first rotational component in the at least one rotational component into a horizontal rate of movement of the horizontal cursor movement;

transforming a second linear component of the at least one linear component into the vertical cursor movement; and transforming a second rotational component of the at least one rotational component into a vertical rate of movement of the vertical cursor movement.

19. The method of claim 18, wherein a relationship between the first rotational data and the horizontal rate of movement follows a horizontal acceleration function that is configurable by a user interface and a relationship between the second rotational data and the vertical rate of movement follows a vertical acceleration function that is configurable by the user interface.

20. A remote control comprising:

a housing configured to be held between a first finger and a second finger of a user;

one or more buttons, wherein each of the one or more buttons is configured to be operable by the first finger or the second finger of the user while the user is holding the housing of the remote control between the first finger and the second finger;

an inertial measurement unit configured to collect inertial data, wherein the inertial data includes at least one linear component and at least one rotational component that indicate a movement of the remote control;

a wireless transmitter configured to transmit horizontal cursor movement data and vertical cursor movement data from the remote control to a content receiver;

one or more memories configured to collectively store computer instructions and a customization function for the user, wherein the customization function defines at least one transformation of the inertial data into the horizontal cursor movement data and the vertical cursor movement data to customize control of a cursor on a display for the user; and one or more processors configured to execute the computer instructions to:

define a default orientation of the remote control using a user-positioned orientation of the remote control for the user;

obtain the inertial data from the inertial measurement unit;

modify the customization function based on the default orientation;

transform, using the modified customization function, a combination of the at least one linear component and the at least one rotational component into the horizontal cursor movement data and the vertical cursor movement data; and transmit, by the wireless transmitter, the horizontal cursor movement data and the vertical cursor movement data to the content receiver for controlling the cursor on the display.

\* \* \* \* \*